(12) United States Patent
Savard

(10) Patent No.: US 9,982,915 B2
(45) Date of Patent: May 29, 2018

(54) AIR HEATING UNIT USING SOLAR ENERGY

(71) Applicant: Gilles Savard, Jonquiere (CA)

(72) Inventor: Gilles Savard, Jonquiere (CA)

( * ) Notice: Subject to any disclaimer, the term of this patent is extended or adjusted under 35 U.S.C. 154(b) by 135 days.

(21) Appl. No.: 15/050,494

(22) Filed: Feb. 23, 2016

(65) Prior Publication Data

US 2017/0241670 A1    Aug. 24, 2017

(51) Int. Cl.
*F24J 2/05*    (2006.01)
*F24J 2/20*    (2006.01)

(52) U.S. Cl.
CPC ............ *F24J 2/05* (2013.01); *F24J 2/202* (2013.01); *Y02E 10/44* (2013.01)

(58) Field of Classification Search
CPC .............. F24J 2/05; F24J 2/20; F24J 2/202
See application file for complete search history.

(56) References Cited

U.S. PATENT DOCUMENTS

| | | |
|---|---|---|
| 2,488,615 A | 11/1949 | Arnold |
| 2,591,398 A | 4/1952 | Brock |
| 2,691,991 A | 10/1954 | Schutt et al. |
| 2,826,220 A | 3/1958 | Young |
| 2,852,042 A | 9/1958 | Lynn |
| 4,015,584 A | 4/1977 | Haberman |
| 4,068,652 A | 1/1978 | Worthington |
| 4,085,728 A * | 4/1978 | Tomchak ............ F24J 2/0438 126/658 |
| 4,106,558 A | 8/1978 | Neveux |
| 4,141,338 A * | 2/1979 | Lof .................. F24J 2/0488 126/674 |
| 4,249,512 A | 2/1981 | Rivetti et al. |
| 4,266,531 A * | 5/1981 | Behrendt ............ F24J 2/202 126/629 |
| 4,366,808 A * | 1/1983 | Nash .................. F24J 2/202 126/667 |
| 4,577,681 A | 3/1986 | Hughes |
| 4,727,907 A | 3/1988 | Duncan |
| 4,823,865 A | 4/1989 | Hughes |
| 4,881,596 A | 11/1989 | Bergmann et al. |
| 4,898,153 A * | 2/1990 | Sherwood ............ F24J 2/202 126/664 |
| 5,070,937 A | 12/1991 | Mougin |
| 5,361,828 A | 11/1994 | Lee et al. |
| 6,578,627 B1 | 6/2003 | Liu et al. |
| 2004/0037162 A1 | 2/2004 | Flohr et al. |
| 2009/0293862 A1 | 12/2009 | Bailey |
| 2013/0081795 A1 | 4/2013 | Janezich et al. |

FOREIGN PATENT DOCUMENTS

| | | |
|---|---|---|
| CN | 202757295 | 2/2013 |
| CN | 104533538 | 4/2015 |
| EP | 0845580 | 3/1998 |
| JP | 55155193 A * | 12/1980 |
| JP | S6086389 | 5/1985 |

* cited by examiner

*Primary Examiner* — Daniel J Colilla

(57) ABSTRACT

An air heating unit using solar energy has an inner core further comprised of at least one passageway within which air circulates while being interfered by baffles shaped, sized, and positioned so as to create turbulence in the air flow in order to homogeneously warm the air.

5 Claims, 3 Drawing Sheets

FIG. 2
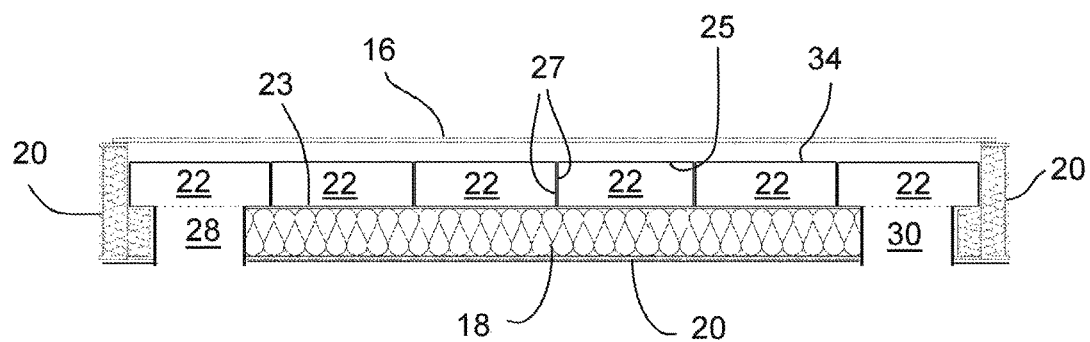
FIG. 3A
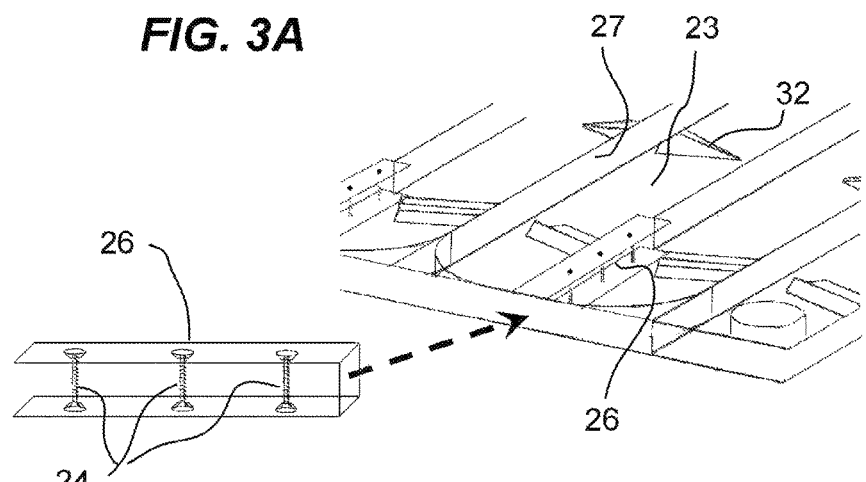
FIG. 3B

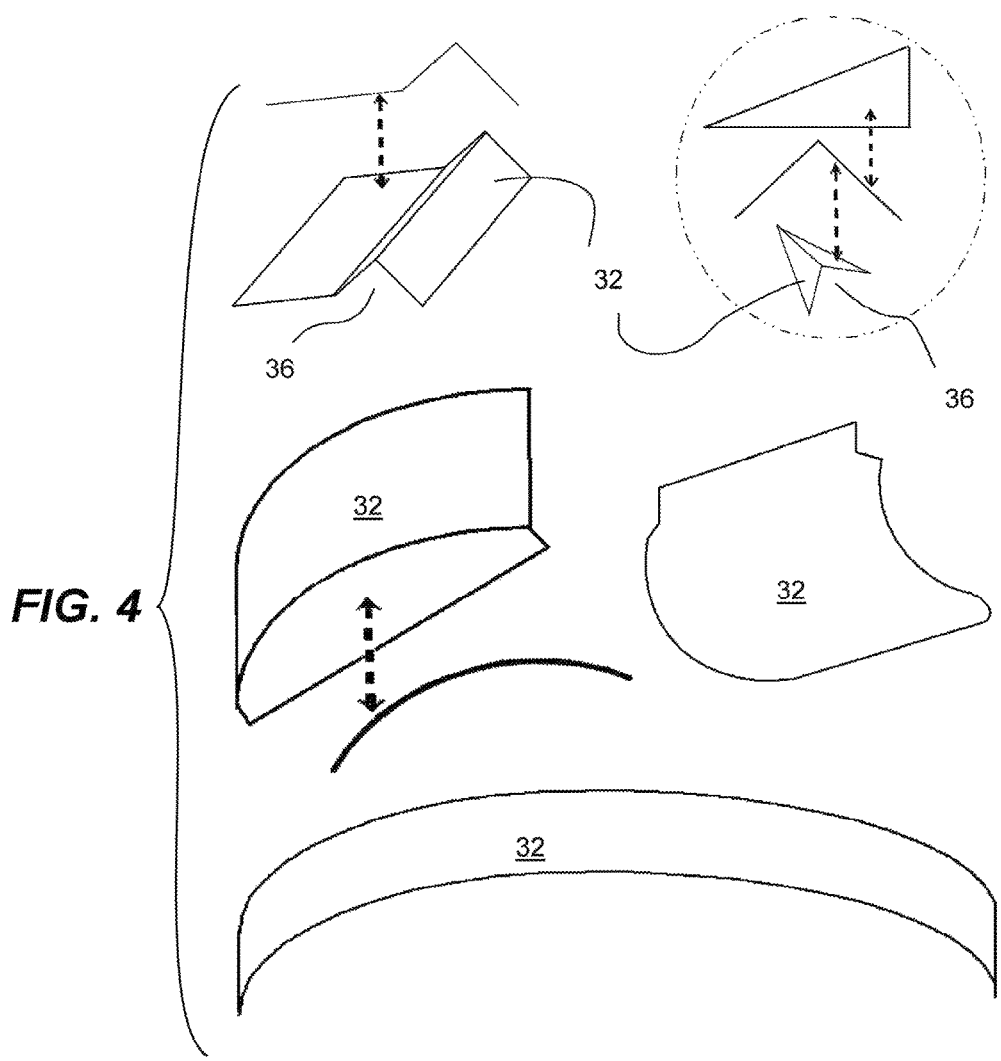
FIG. 4
FIG. 5
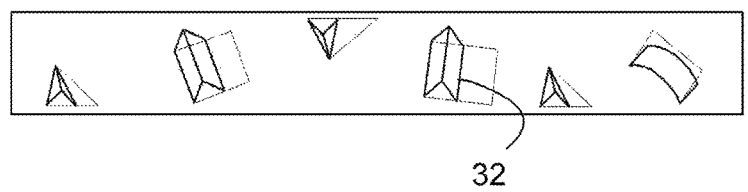

AIR HEATING UNIT USING SOLAR ENERGY

FIELD OF THE INVENTION

The present invention relates generally to air heating apparatus but more particularly to a device that captures, retrieves and transfers solar energy to the air, in order to make it usable.

BACKGROUND OF THE INVENTION

Using the sun to produce electricity or heat up water has been known for decades, and so has the heating of air by way heat generated by the sun. Current technology is not very efficient when it comes to heat transfer.

SUMMARY OF THE INVENTION

In view of the foregoing disadvantages inherent in the known devices now present in the prior art, the present invention, which will be described subsequently in greater detail, is to provide objects and advantages which are:

To provide for an air heating apparatus that captures, retrieves and transfers solar energy to the air, in order to make it usable.

In order to do so, the invention comprises an inner core further comprised of at least one passageway within which air circulates while being interfered by baffles shaped, sized, and positioned so as to create turbulence in the air flow in order to homogeneously warm the air.

A plurality of the passageways are juxtaposed and joined to each other by way of gates to allow the air to flow alternately from one of the passageway to the next passageway, so that the air can circulate between an air inlet and an air outlet.

The gate consists in a pair of parallel horizontal members joined by at least one, but preferably a plurality of metal rods located at different intervals along the gate so as to provide the gate with rigidity so that it can prevent the deformation of the metal by way of the action of heat, caused by the difference of temperature between a side exposed to the sun and its reverse side not exposed to the sun.

The passageway has a semi-circular arc baffle member located at a change of direction leading into the next passageway so as to facilitate the reorientation of the air flow by minimizing restriction.

Ends of the passageways are closed mechanically by means of extrusion molding or metal foil to provide airtight passageways.

The baffle member is made from metal sheet cut-outs and fixed individually or in series on the the face opposite to that receiving solar radiation, and inside the passageway.

The baffle members have different shapes designed to create and enhance turbulence.

The air heating unit is used in combination with an outer casing having a glass pane on one of its face while other sides are formed of an insulating material covered with a protective cladding and wherein an inner core forming part of the air heating unit has its sun exposed surface located under the glass pane and is further comprised of at least one passageway within which air circulates while being interfered by baffles shaped, sized, and positioned so as to create turbulence in the air flow in order to homogeneously warm the air.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiment of the invention.

BRIEF DESCRIPTION OF THE DRAWINGS

FIG. 2 Cutaway front view of the invention.

FIGS. 3a-b Isometric view of a section of the invention with the ceiling part removed to show the inside of the passageway and a detail of a gate.

FIG. 4 Isometric views of various baffles.

FIG. 5 Isometric view of baffles forming part of a metal sheet.

DETAILED DESCRIPTION

Figure 1:
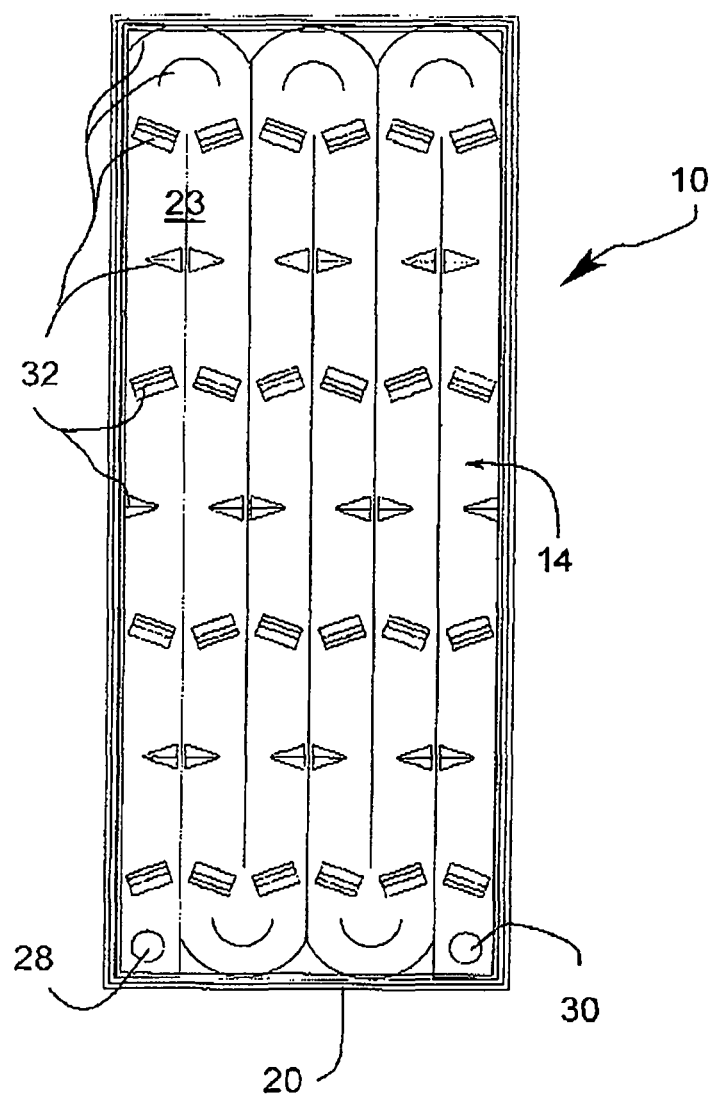
FIG. 1 Plan view of the invention.

An air heating unit using solar energy has an outer casing (10), which does not form part of the invention since its various modes of assemblies and materials are well known in the art. It is used for protect, provide support and isolate an inner core member (14) located therein. Like most outer solar collector casings, it consists of a glass pane (16) on one of its face while other sides are formed of an insulating material (18) covered with a protective cladding (20).

The inner core member (14), which is the innovative part of the invention, consists in an assembly of various metallic and non-metallic parts having specific functions designed to increase the efficiency in collecting solar energy, and transferring it so as to heat the air circulating therein by creating multi-directional turbulence which multiplies contact occurrence of each air molecule coming in contact with a floor part (23) having baffles (32), a ceiling part (25), and wall parts (27) forming a passageway (22) which captures the sun's energy. In this manner all air molecules can rapidly be heated up.

Typically, a passageway (22) is made of molded metal sheet or extruded metal form to create the floor part (23), the wall part (27) and the ceiling part (25), which sits just under the glass pane (16), and having its sun exposed surface covered with a substance (34) that absorbs infra-red radiation. All surfaces being exposed to infra red radiation are optimized to capture that heat by being covered with the substance (34). Such substances (34) are known in the art and do not need to be further dicussed herein.

Passageways (22) are juxtaposed and joined to each other with gates (26) to allow air to flow alternately from one passageway (22) to the next, between an air inlet (28) and an air outlet (30). Additionally, the gate (26) is also used for the function of preventing the deformation of the metal by way of the action of heat, caused by the difference of temperature between the side exposed to the sun and the flip side not exposed. Metal rods (24) at different locations of the gate (26) give it the rigidity and stability required to perform that function.

Semi-circular arc baffles members (32) are located at each change of direction of the passageway (22), when the air passes from one to the next to promote the reorientation of the air flow by minimizing the restriction which could slow down the air.

The ends of the passageways (22) are closed mechanically by means of extrusion molding or metal foil, and the whole assembly is mechanically closed with seals and metal parts for airrtight assembly and to avoid infiltration and exfiltration which would cause energy losses.

Various shapes make up baffle members (32) which can be made out from metal sheet cut-outs and fixed individually or in series on the opposite face of the floor part (23) but popping up inside the passageway (22), as per FIG. 3b or 5. The fact that they are cut-outs lifted to create the shape, creates additional air turbulence from openings (36) created by lifting up the cut-outs. The variety of shapes and sizes include, but is not limited to three sided asymmetric pyramids, triangular elongated gabled shapes, semi-circular arcs, etc.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An air heating unit using solar energy comprising an inner core having a surface exposed to the sun covered with material for capturing and transforming solar energy into thermal energy for heating an air flow; further comprised of at least two passageways within which air circulates while being interfered by baffles shaped, sized, and positioned so as to redirect molecules of said air flow towards the said surface exposed to the sun and create turbulence in the air flow in order to homogeneously warm said air; at least one pair of semicircular arc baffle members located at a change of direction leading into the next said passageway so as to facilitate the reorientation of the air flow by minimizing restriction; said baffle members having one of a plurality of possible shapes including a three sided asymmetric pyramid, a triangular elongated gabled shape.

2. An air heating unit as in claim 1 wherein a plurality of said passageways are juxtaposed and joined to each other by way of gates to allow said air to flow alternately from one said passageway to the next said passageway, so that said air can circulate between an air inlet and an air outlet.

3. An air heating unit as in claim 2 wherein said each of said gates having at least one, but preferably a plurality of metal rods located at different intervals along said gate to provide said gate with rigidity so that said gate can prevent metal deformation by way of the action of heat, caused by the difference of temperature between a side exposed to the sun and its reverse side not exposed to the sun.

4. An air heating unit as in claim 1 wherein ends of said passageways being closed mechanically by means of extrusion molding or metal foil to provide airtight passageways.

5. An air heating unit as in claim 1 wherein said baffles are fixed individually or in series on a face opposite to that receiving solar radiation, and inside said passageway.

* * * * *